United States Patent [19]

Haessig, Jr.

[11] Patent Number: 5,307,206

[45] Date of Patent: Apr. 26, 1994

[54] IMAGE STABILIZATION ASSEMBLY FOR AN OPTICAL SYSTEM

[75] Inventor: David A. Haessig, Jr., Towaco, N.J.

[73] Assignee: GEC-Marconi Electronic Systems Corp., Wayne, N.J.

[21] Appl. No.: 954,525

[22] Filed: Sep. 30, 1992

[51] Int. Cl.$^5$ .............................................. G02B 27/64
[52] U.S. Cl. .................................... 359/555; 359/554; 318/611; 318/615; 318/616; 364/453
[58] Field of Search ........................ 318/611, 615, 616; 359/554, 555; 74/5.22; 364/453

[56] References Cited

U.S. PATENT DOCUMENTS 4,881,800  11/1989  Fuchs et al. .
5,203,220   4/1993  Lerman ........................... 359/555
5,220,456   6/1993  Haessig, Jr. .................... 359/554

OTHER PUBLICATIONS

Patent Application Ser. No. 07/802,870, filed Dec. 6, 1991.

Primary Examiner—Loha Ben
Assistant Examiner—Thomas Robbins
Attorney, Agent, or Firm—David L. Davis

[57] ABSTRACT

An arrangement for stabilizing the line of sight in an optical tracking system relative to inertial space over a specified range of frequencies utilizing a mirror/torquer/pickoff subassembly both as an inertial sensor and as a control effector.

14 Claims, 6 Drawing Sheets $$\dot{x}_1 = \omega_m = x_2$$

$$\dot{x}_2 = (-K_m \cdot [\theta_m - \theta_B] + \tau' + V_1)/J_m$$
$$= -\frac{K_m}{J_m}(x_1 - x_4) + \tau'/J_m + V_1/J_m$$

$$\dot{x}_3 = \theta_B = x_4$$

$$\dot{x}_4 = V_2 - 2\sigma\Omega\theta_B - \Omega^2 I_B$$
$$= V_2 - 2\sigma\Omega x_4 - \Omega^2 x_3$$

$$\dot{\theta}_m = \omega_m$$
$$\dot{\omega}_m = \frac{1}{J_m}[\tau' + V_1 - K_m(\theta_m - \theta_B)]$$
$$\dot{\omega}_B = V_2 - 2\sigma\Omega\,\omega_B - \Omega^2\theta_B$$
$$\dot{\theta}_B = \omega_m$$

IMAGE STABILIZATION ASSEMBLY FOR AN OPTICAL SYSTEM

BACKGROUND OF THE INVENTION

This invention relates to an optical system which tracks a commanded line of sight and, more particularly, to an arrangement in such a system for stabilizing the system line of sight relative to inertial space over a specified range of frequencies.

U.S. Pat. No. 4,881,800, the contents of which are hereby incorporated by reference, discloses an optical tracking and image stabilization system for use in an aircraft which tracks the movement of the pilot's helmet by developing a position command signal which causes the line of sight of the optical system to follow the line of sight of the pilot. In the disclosed system, a mirror is flexibly mounted to a rigid block which in turn is fixedly mounted to the inner gimbal of a pair of gimbals. A gyroscope having a spin axis aligned with the line of sight of the optical system is mounted to the rigid block to develop signals which are utilized to control movement of the mirror relative to the rigid block so as to nullify environmental perturbations which emanate both from the gimbal system during its positioning of the rigid block and from the aircraft.

A substantial portion of the cost of such an optical system is due to the gyroscope and its associated electronics. In addition, the incorporation of a gyroscope in such a system impacts on the amount of space required for the system. In an airborne system, such as that disclosed in the above-referenced patent, the size and weight of the system is a critical factor so that elimination of the gyroscope would be advantageous. In certain respects, optical binoculars are similar to the optical system disclosed in the referenced U.S. patent. Thus, both include a mirror mounted to a base and both track a commanded line of sight, the binoculars doing so by manual positioning whereas in the referenced patent, this is accomplished electromechanically. In the latter, the command consists of two components; the helmet angular position relative to the vehicle and the vehicle angular position, thereby creating a line of sight command relative to inertial space. Thus, the manual positioning of the binoculars is analogous to the maneuvering of the aircraft. The present invention is applicable in both cases, when the relative command is present or when it is not. In addition, it would be impractical to include a gyroscope in a pair of binoculars so that elimination of the gyroscope from an image stabilization arrangement would be advantageous to this application. Further, both are subject to environmental perturbations which vibrate the line of sight and hence the image viewed by the observer. The desired frequency response of both types of systems is also similar. Thus, if one considers the ratio of change of line of sight angle to change of base angle over a frequency band, at low frequencies this ratio should be unity because the line of sight should follow the base in a one-to-one fashion. For example, in a head-steered line of sight pointing system with a helmet mounted display, the line of sight should follow the helmet, whereas in the case of binoculars, the orientation of the line of sight should follow the nominal orientation of the binoculars. However, the jittery motions that occur at higher frequencies either due to vehicle vibration in the case of the referenced patent or because the user cannot hold the binoculars steady, especially at higher magnification, are undesirable. Thus, the ratio of change of line of sight angle to change of base angle should be smaller in that region of the frequency band so that less of this undesirable base motion is transmitted to the line of sight. Therefore, in order to reduce the cost and size of an image stabilization system, as described above, it is an object of the present invention to provide such an image stabilization arrangement without the necessity for a gyroscope and its associated electronics.

In my copending U.S. patent application Ser. No. 07/802,870, filed Dec. 6, 1991, and assigned to the assignee of the present invention, now U.S. Pat. No. 5,220,456, issued Jun. 15, 1993, I disclose a gyroless arrangement for stabilizing the line of sight in an optical tracking system of the type disclosed in the referenced patent by isolating the line of sight from angular vibration induced by the gimbal system. This gyroless arrangement is useful in applications where vehicle vibration can be ignored, but is not effective where vehicle vibration is a significant factor. It is therefore a more specific object of the present invention to provide a gyroless image stabilization arrangement of the type described which is effective over the frequency band of interest to nullify the effects of all environmental perturbations.

SUMMARY OF THE INVENTION

In the referenced patent, the optical tracking system includes a stabilization assembly having a mirror, pickoff and torquer. The present invention recognizes that the mirror, pickoff and torquer comprise all of the elements necessary to create an inertial sensor, with the mirror being the proof mass. The position of the mirror relative to the rigid block to which it is mounted is measured by the pickoff and the applied torque is known. Therefore, the present invention contemplates causing the mirror to serve a dual purpose—(a) it is used as the control effector, effecting changes in the angular orientation of the line of sight by its motion, and (b) it is an integral part of the inertial sensor, providing a measure of the angular acceleration of the rigid block. Thus, according to this invention, there is provided an assembly for rejecting environmental perturbations in an optical system which tracks a command line of sight. The assembly comprises a mirror, a rigid block, means for flexibly coupling the mirror to the rigid block and providing two axes of rotational freedom for the mirror, torquer means for torquing the mirror about each of the axes, and pickoff means for sensing the angular position of the mirror relative to the rigid block about each of the axes and providing pickoff signals corresponding thereto. The assembly further comprises control means receiving the pickoff signals and utilizing the dynamic properties of the mirror as coupled to the rigid block and the dynamic properties of the rigid block for providing a torquer signal for each of the axes to the torquer means. The control means utilizes the mirror in conjunction with the torquer means and the pickoff means as an inertial sensor to provide a measure of the angular motion of the rigid block, and as a control effector to isolate the line of sight from unintentional, higher frequency rigid block motion (jitter or vibration) and to cause the optical system line of sight to track intentional, lower frequency rigid block motion (position commands).

In accordance with an aspect of this invention, the control means comprises a respective compensator for each of the axes. Each compensator is designed using the techniques of modern control theory and utilizes the respective pickoff signal for calculating a plurality of estimated states used for generating the respective torquer signal. The estimated states include at least mirror angle, mirror angular rate and rigid block angle.

In accordance with another aspect of this invention, each compensator generates the respective torquer signal by multiplying each of its calculated estimated states by a respective gain coefficient and summing the results.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1:
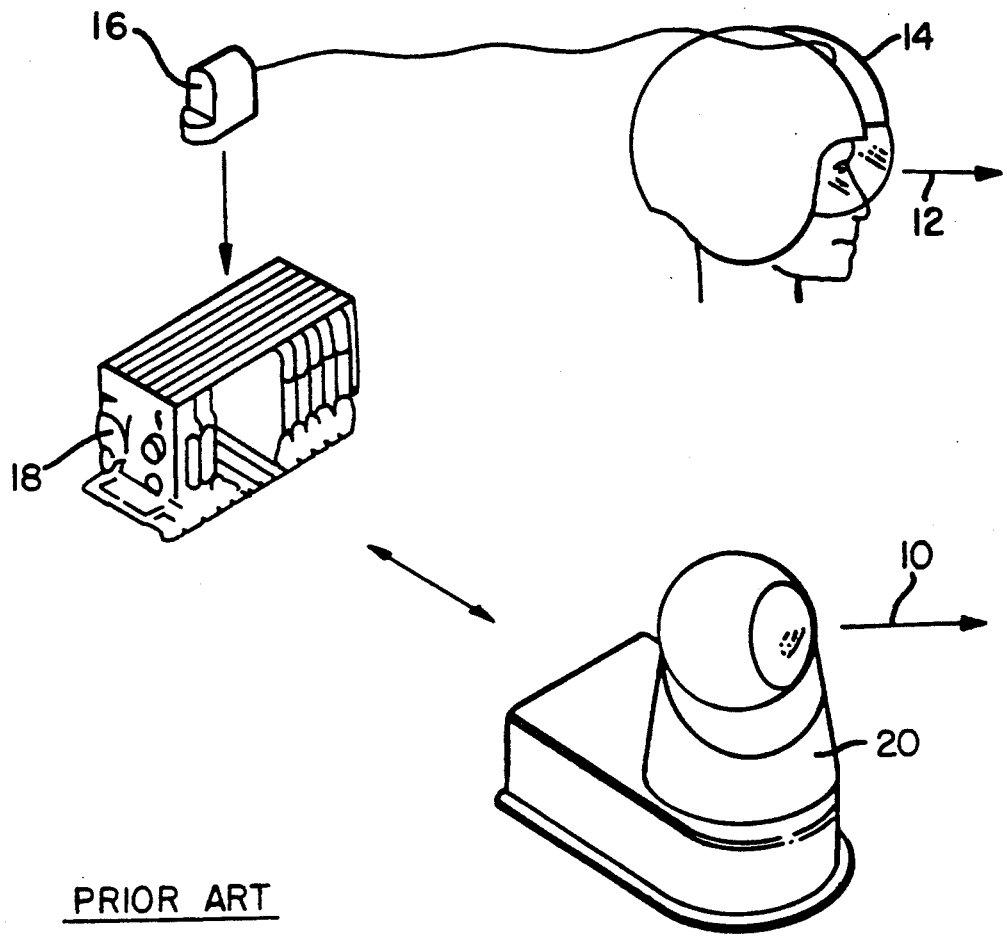
FIG. 1 is a pictorial depiction of a prior art optical tracking system in which the present invention may be incorporated.

FIG. 1 illustrates a prior art aircraft night vision optical tracking system having a line of sight, shown by the arrow 10, which tracks the line of sight of the pilot, shown by the arrow 12. In this system, an infrared image is captured and displayed on a screen attached to the pilot's helmet 14. The pilot can focus on this screen or look through the screen, seeing either an infrared image or a normal image, respectively. Therefore, the line of sight 10 of the system must accurately track the line of sight 12 of the pilot to provide proper image registration. The position of the pilot's helmet 14 relative to the cockpit of the aircraft is sensed magnetically and is sent by the transmitter 16 to the system electronics 18 to provide a position command signal. As disclosed in the referenced patent, the mechanical portion of the optical tracking system includes a turret system 20 having an azimuth gimbal mounted to the aircraft structure, which structure acts as a ground plane. The mounting of the azimuth gimbal is by means of bearings so that the gimbal is rotatable about an azimuth axis of rotation. The turret system 20 also includes an elevation gimbal mounted to the azimuth gimbal via bearings so as to be rotatable about an elevation axis of rotation. A rigid block is fixedly mounted to the elevation gimbal and a mirror is movably mounted to the rigid block via a flexure hinge. The line of sight 10 of the tracking system is reflected off the mirror. Tracking is accomplished by rotating the gimbals of the turret system 20 and by moving the mirror. Movement of the azimuth and elevation gimbals coarsely positions the line of sight 10 and image stabilization is effected by controlling the position of the mirror relative to the rigid block.

Figure 2:
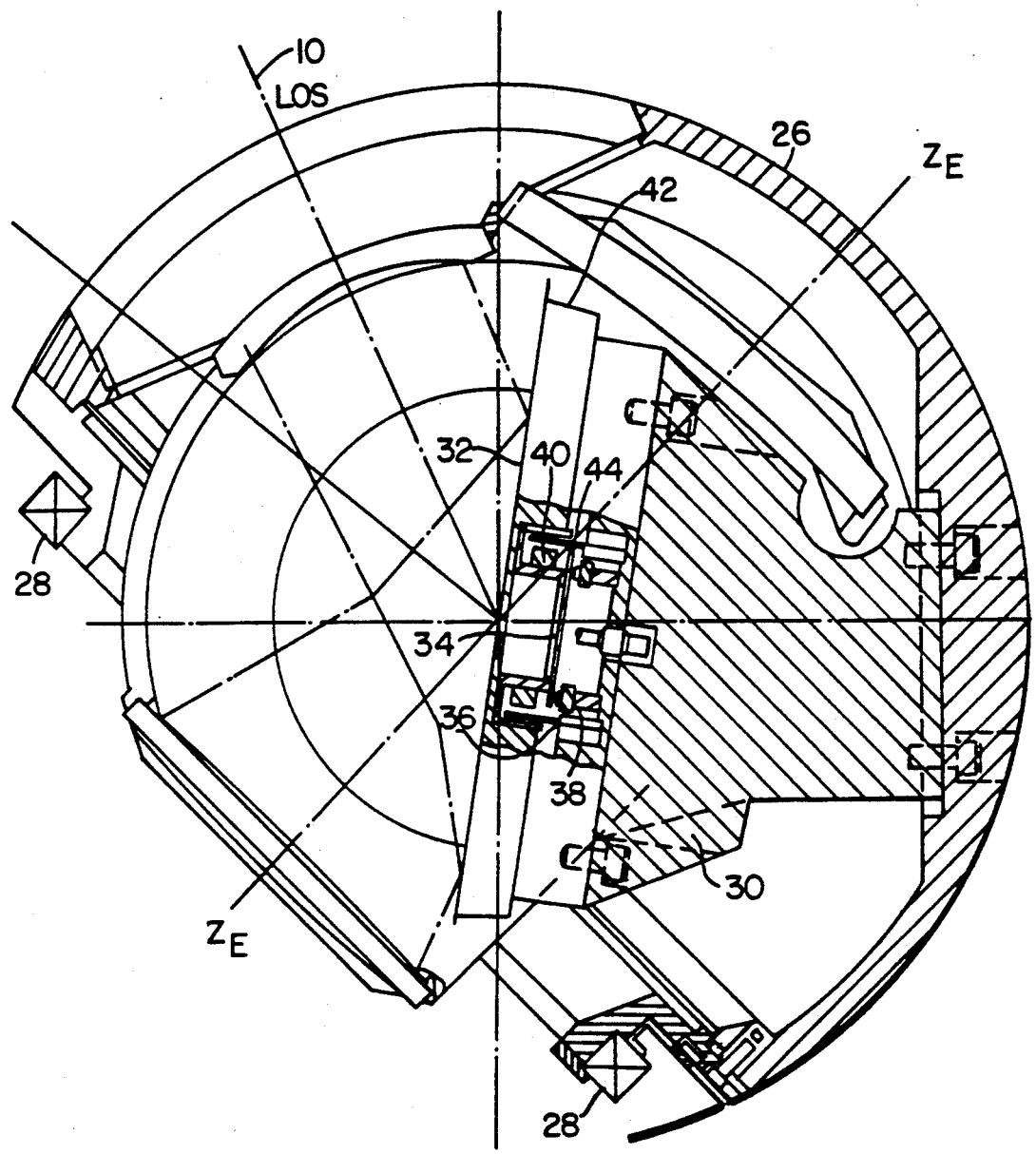
FIG. 2 is a detailed illustration showing a prior art gyroless image stabilization subassembly which may be used in the optical tracking system of FIG. 1 and showing the elevation gimbal, the rigid block and the mirror.

FIG. 2 shows the elevation gimbal assembly in more detail. As shown therein, and as described in the referenced patent, the elevation gimbal 26 is mounted to the azimuth gimbal (not shown) via the bearings 28 so as to be rotatable about an elevation axis of rotation $Z_E$. Fixedly mounted to the elevation gimbal 26 is a rigid block 30. A mirror 32 is movably mounted to the rigid block 30 via a flexure hinge 34 which provides two axes of limited freedom and a small amount of restoring torque to the mirror 32. These axes may be parallel to the plane of the mirror 32.. The end portion of the flexure hinge 34, as well as two pairs of torquer coils 36, is attached to the rigid block 30. Also attached to the block 30 are two pairs of proximity sensing pickoff coils 38. The pickoff and torquer coils 38, 36 are positioned concentrically with the flexure hinge 34 such that the two pairs of torquer coils 36 react with a permanent magnet ring 40, which is coupled to the underside of the mirror 32 within the mirror base 42. Similarly, the pickoff coils 38 react with a return path coil 44, also mounted to the mirror base 42.

The optical tracking system thus includes two positioning systems. The first positioning system is a coarse positioning arrangement which rotates the azimuth and elevation gimbals in response to the input position command signal so that the rigid block 30 attains a position defined by that position command signal. The other positioning system is the image stabilization arrangement which moves the mirror 32 relative to the rigid block 30 in order to reject vibrational disturbances which result in jitter of the system line of sight 10 and better track the commanded line of sight. These vibrational effects arise from two sources. The first source is vehicle vibration. The second source is vibration of the coarse positioning system generated by movement of the azimuth and elevation gimbals.

Figure 3:
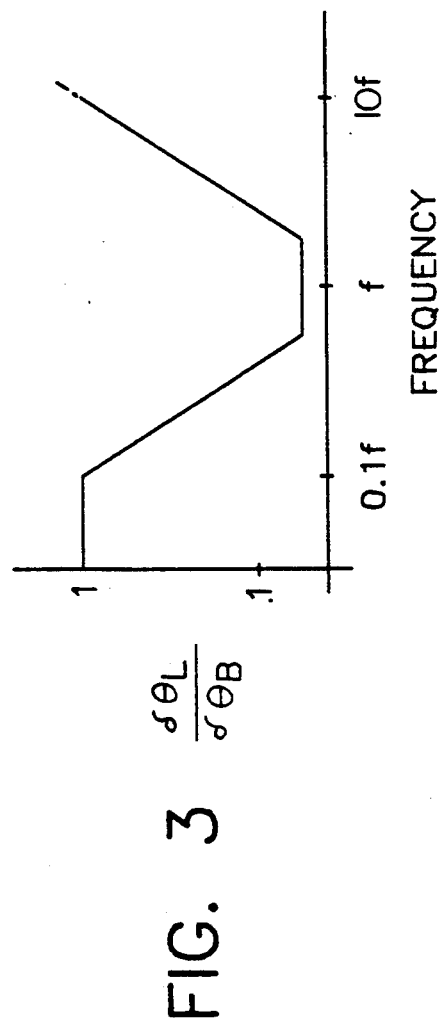
FIG. 3 illustrates the desired frequency response of the arrangement according to this invention.

FIG. 3 shows an illustrative desired frequency response of the image stabilization arrangement. In FIG. 3, $\delta\Theta_L/\delta\Theta_B$ defines, as a function of frequency, the ratio of change of line of sight angular position to change of angular position of the rigid block 30. The range of frequencies where rejection occurs can be adjusted. At low frequencies, the ratio be $\delta\Theta_L/\delta\Theta_B$ should be unity. This is because the line of sight should follow the rigid block in a one-to-one fashion. As described above, in a head-steered line of sight pointing system on an aircraft, in the absence of helmet commands, the line of sight must follow the aircraft and in so doing, it follows the helmet in a one-to-one fashion. In the case of binoculars, the orientation of the line of sight should follow the nominal orientation of the binoculars. However, the jittery motions that occur at higher frequencies centered about the frequency f due to aircraft or coarse positioning system vibration, as well as the non-steadiness of the user of the binoculars, are undesirable so that the ratio $\delta\Theta_L/\delta\Theta_B$ must be smaller in that region so that less of this undesirable motion is transferred to the line of sight. At even higher frequencies there is little motion of the rigid block. Therefore, the ratio here can increase without degrading performance. It is not necessary that the ratio $\delta\Theta_L/\delta\Theta_B$ increase in that region, but one does not care if it does.

Figure 4:
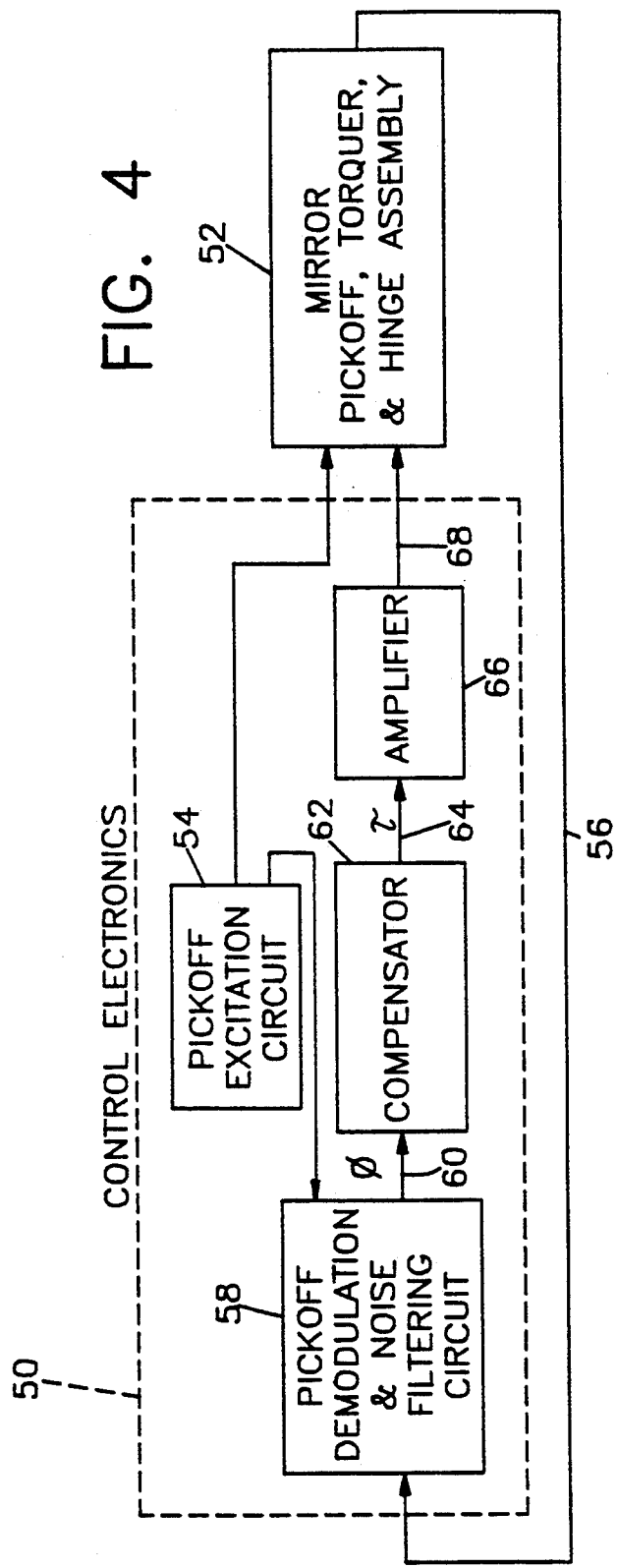
FIG. 4 is a block diagram of an illustrative control loop for moving the mirror about one of its axes.

The flexure hinge 34 provides for movement of the mirror 32 about two axes, both of which may be parallel to the plane of the mirror 32. FIG. 4 is a block diagram showing an illustrative control loop for one axis of this two axis system. As shown in FIG. 4, the illustrative control loop includes the control electronics 50 which provides signals to the mirror pickoff, torquer and hinge assembly 52 and receives feedback signals from the assembly 52. The control electronics 50 includes the pickoff excitation circuit 54 which provides excitation signals to the pickoff coils 38 and to the demodulation circuitry 58. The pickoff coils 38 provide signals in return over the lead 56 to the pickoff demodulation and noise filtering circuit 58 which provides a pickoff angle $\phi$ signal on the lead 60. The pickoff angle $\phi$ is the difference between the mirror angle $\Theta_m$ and the rigid block angle $\Theta_B$. The angles $\Theta_m$ and $\Theta_B$ are relative to an inertial frame of reference. When utilized in the model to be described hereinafter, they represent estimates of the angular positions within the frequency range of interest and are set to zero at system startup.

The pickoff angle signal on the lead 60 is provided as an input to the compensator 62 which operates in accordance with a control algorithm, to be described in full detail hereinafter, to provide a torquer signal on the lead 64 to the amplifier 66. The output of the amplifier 66 on the lead 68 is used to drive the appropriate torquer coil 36 for the respective axis of interest.

Figure 5:
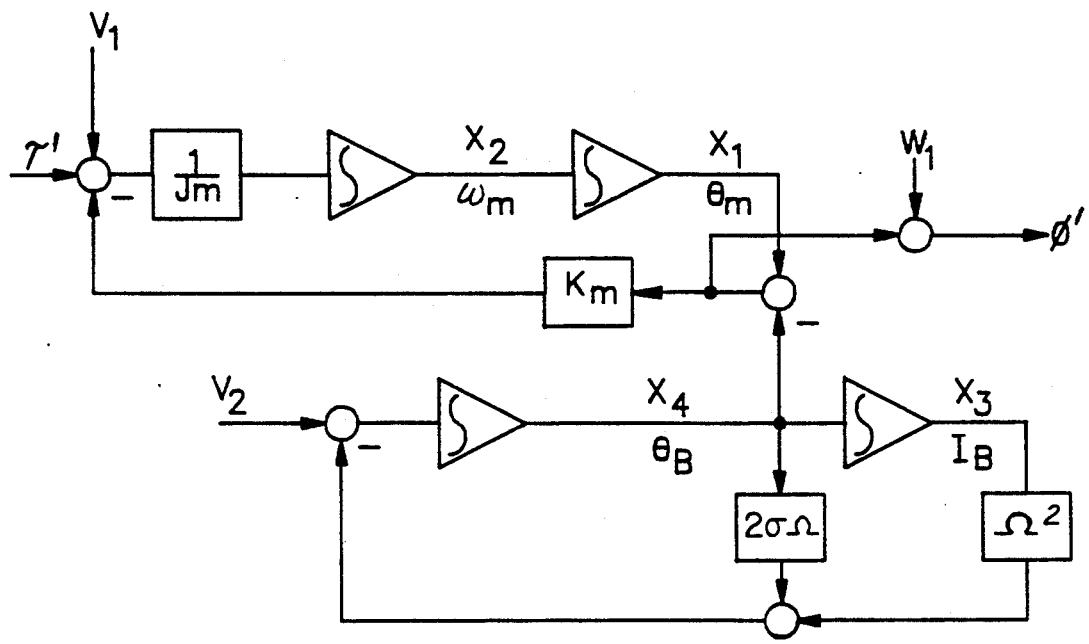
FIG. 5 illustrates a first embodiment of a design model defining the system being controlled and the disturbances acting on the system.

FIG. 5 shows a first embodiment of a design model, and its equations, which may be utilized for constructing the compensator 62 (FIG. 4). This design model consists of a mirror motion submodel and a rigid block motion submodel. In FIG. 5, the upper loop is a second order spring-mass system which models the motion of the mirror 32 and the flexure hinge 34 and the lower loop is a second order model of the motion of the rigid block 30. In these models, the constant $J_m$ represents the mirror 32 inertia and the constant $K_m$ represents the flexure hinge 34 angular spring rate. The parameters $\Omega$ and $\sigma$ are user selectable constants related to the frequency content of the rigid block 30 vibration which is to be rejected. These parameters and their selection are well known to those of skill in the art of modern control theory. The inputs to the model include a signal representing the mirror torque $\tau'$ as well as plant noise $v_1$ and $v_2$, which are related to the unwanted vibration, and measurement noise $w_1$. The spectral density coefficients associated with these noise signals are design parameters which are used in the design of the compensator 62. The symbol $\phi'$ represents the pickoff angle.

Figure 6:
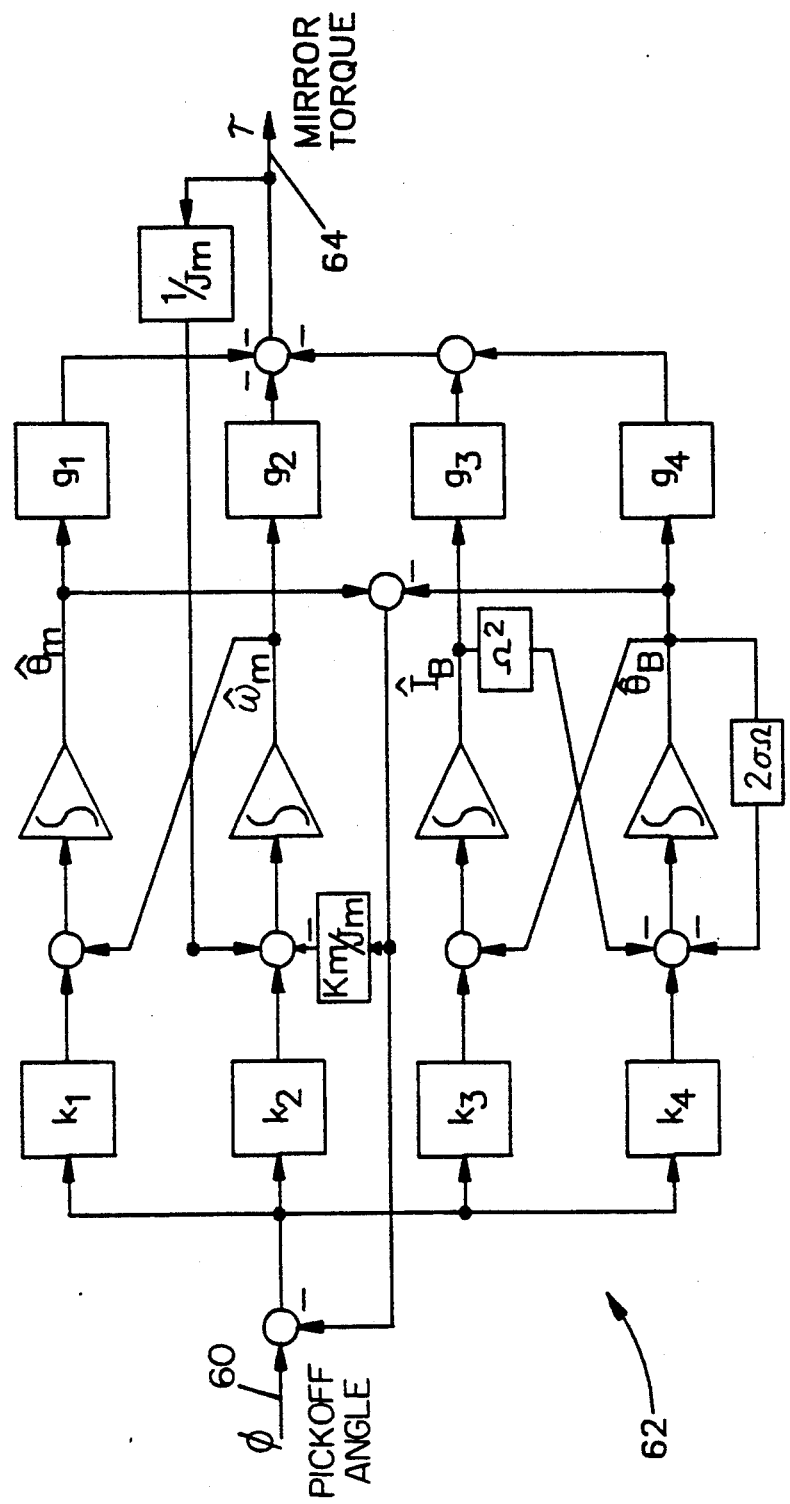
FIG. 6 is a block diagram of a compensator according to the present invention having a construction based upon the design model of FIG. 5.

FIG. 6 is a block diagram of a compensator 62 having a construction based upon the design model of FIG. 5. Although shown as a block diagram of a hard wired circuit, it is understood that the compensator 62 may be implemented as a programmed microprocessor by properly converting from continuous to discrete form and by adding the necessary A/D and D/A converters before and after, respectively, the digital compensator. The control algorithm which defines the operation of the compensator 62 must simultaneously estimate the disturbance of the rigid block 30 and control the mirror 32 to isolate the line of sight from that disturbance. In the FIG. 6 block diagram for the compensator 62, the constants $K_m$ and $J_m$ and the parameters $\Omega$ and $\sigma$ are the same as in the FIG. 5 model. The gain coefficients $k_1$, $k_2$, $k_3$, $k_4$, and $g_1$, $g_2$, $g_3$, $g_4$, are constants computed using the Filter Algebraic Ricatti Equation and the Control Algebraic Ricatti Equation, respectively. Both equations are well known to those of skill in the art of modern control theory.

The basis for the control algorithm of the compensator 62 (FIG. 6) is the set of state equations making up the design model of FIG. 5. In this design model, the difference between the outputs from the submodels (i.e., the mirror angle $\Theta_m$ and the rigid block angle $\Theta_B$) represents the pickoff angle $\phi'$. For this system, the state vector X, including the components $x_1$, $x_2$, $x_3$ and $x_4$, includes the mirror angle $\Theta_m$, the mirror angular rate $\omega_m$, the integral of the rigid block angle $I_B$, and the rigid block angle $\Theta_B$, respectively. The gain coefficients $g_1$, $g_2$, $g_3$ and $g_4$ are computed to minimize the line of sight pointing error as defined by the equation:

$$\Theta_L = \Theta_B + \mu\phi = \mu\Theta_m + (1-\mu)\Theta_B,$$

where $\mu$ is an optical scale factor.

Thus, as shown in FIG. 6, in the compensator 62 the measured pickoff angle $\phi$ has subtracted therefrom the estimated pickoff angle which equals the estimated mirror angle $\Theta_m$ subtracted from the estimated rigid block angle $\Theta_B$. This difference is then multiplied by the gain coefficients $k_1$, $k_2$, $k_3$ and $k_4$ and the results of the multiplications are utilized for calculating the new estimated mirror angle $\Theta_m$, mirror angular rate $\omega_m$, integral of the rigid block angle $I_B$, and rigid block angle $\Theta_B$. These estimated states are then each multiplied by a respective one of the gain coefficients $g_1$, $g_2$, $g_3$ and $g_4$ and the results are summed to generate the torque $\tau$ applied to the mirror. It will be noted from a comparison of FIGS. 5 and 6 that the calculation of the mirror angle $\Theta_m$ estimated state and the mirror angular rate $\omega_m$ estimated state are in accordance with the mirror motion submodel (upper loop) in FIG. 5 and the calculation of the integral of the rigid block angle $I_B$ estimated state and the rigid block angle $\Theta_B$ estimated state are in accordance with the rigid block motion submodel (lower loop) in FIG. 5. Thus, for example, the estimated pickoff angle signal is multiplied by the ratio of the angular spring rate of the flexure hinge 34 ($K_m$) to the mirror 32 inertia ($J_m$) and the result is substracted from the result of dividing the torquer signal by the mirror inertia ($J_m$) for calculating the mirror angular rate $\omega_m$ estimated state.

In a particular application, on one of the two axes of rotation of the mirror 32, $J_m = 3.54 \times 10^{-5}$ N-m-s$^2$; $K_m = 0.096$ M-n/rad; and $\mu = 1.386$. The vibration of the rigid block 30 which is to be rejected has a power spectrum shaped, on a log-log plot, like a pyramid centered at ten Hertz with sides having slopes of plus and minus one. Therefore, in accordance with well known linear system theory techniques, the parameters $\Omega$ and $\sigma$ are set so that $\Omega = 2\pi 10$ and $\sigma = 0.7$.

Figure 7:
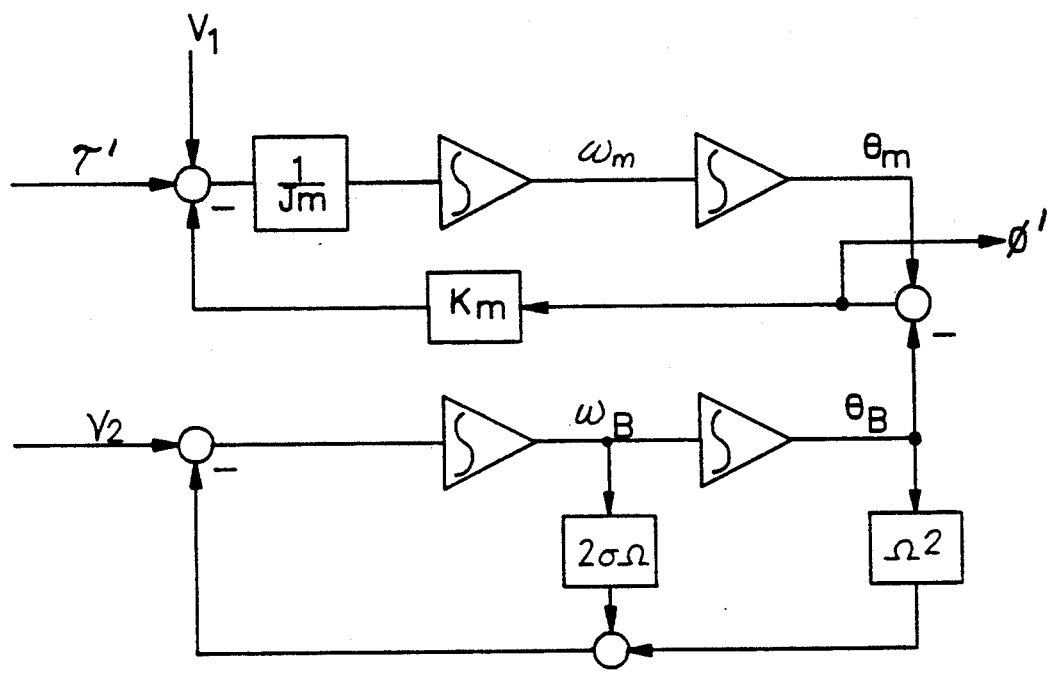
FIG. 7 illustrates a second embodiment of a design model defining the system being controlled and the disturbances acting on the system.

In the design model shown in FIG. 5, the disturbance model (the lower loop) was that of white noise through a second order band pass filter. FIG. 7 is an alternate configuration of a design model wherein the rigid block 30 motion disturbance is like that of white noise through a second order low pass filter. A compensator constructed according to the design model of FIG. 7 would have as its estimated states the mirror angle, mirror angular rate, rigid block angle, and rigid block angular rate.

The foregoing discussion has assumed that there are no helmet commands relative to the vehicle. In this case, the aircraft and binoculars systems are analogous. When helmet commands relative to the vehicle are present, the rate of the relative command is used as an input to the compensator, and the compensator contains a fifth state variable—the estimate of the relative command rate. There is also a fifth controller gain $g_5$ and a fifth filter gain $k_5$. The present invention in this form responds to commands relative to the vehicle in the same way as the device disclosed in the referenced patent.

There has thus been disclosed an improved image stabilization assembly for an optical system which is effective to nullify vibrational effects over a specified range of frequencies. This arrangement utilizes the mirror/torquer/pickoff subassembly as an inertial sensor in addition to its traditional function as a control effector. Although illustrated in the environment of an aircraft optical tracking system wherein unwanted vibrations would be centered about ten Hertz, it is apparent that other frequency ranges can be chosen. Thus, in the case of binoculars, the unwanted vibrations would be centered about two Hertz. The present invention can also be utilized to stabilize the image in a video camera system. Accordingly, while exemplary embodiments have been disclosed herein, it will be appreciated by those skilled in the art that various modifications and adaptations to the disclosed embodiment may be made and it is only intended that this invention be limited by the scope of the appended claims.

I claim:

1. An assembly for rejecting environmental perturbations in an optical system which tracks a command line of sight, comprising:
   a mirror;
   a rigid block;
   means for flexibly coupling the mirror to the rigid block, the flexible coupling means providing two axes of rotational freedom for the mirror;
   torquer means for torquing the mirror about each of said axes;
   pickoff means for sensing the angular position of the mirror relative to the rigid block about each of said axes and providing pickoff signals corresponding thereto; and
   control means receiving the pickoff signals and utilizing the dynamic properties of the mirror as coupled to the rigid block and the dynamic properties of the rigid block for providing a torquer signal for each of said axes to said torquer means, the control means utilizing the mirror in conjunction with the torquer means and the pickoff means as an inertial sensor to provide a measure of the angular motion of the rigid block, and as a control effector means to isolate the line of sight from unintentional, higher frequency rigid block motion and to cause the optical system line of sight to track intentional, lower frequency rigid block motion.

2. The assembly according to claim 1 wherein the control means comprises a respective compensator for each of said axes, each compensator utilizing the respective pickoff signal to calculate a plurality of estimated states used for generating the respective torquer signal, the plurality of estimated states including at least mirror angle, mirror angular rate and rigid block angle.

3. The assembly according to claim 2 wherein each compensator multiplies each calculated estimated state by a respective gain coefficient and sums the results to generate the respective torquer signal.

4. The assembly according to claim 3 wherein each compensator subtracts the rigid block angle estimated state from the mirror angle estimated state to derive an estimated pickoff angle signal which is then subtracted from the respective received pickoff signal, the result being utilized for calculating the plurality of estimated states.

5. The assembly according to claim 4 wherein each compensator contains a model of the mirror and flexible coupling means in which the estimated pickoff angle signal is multiplied by the ratio of the angular spring rate of the flexible coupling means to the mirror inertia and the result is subtracted from the result of dividing the torquer signal by the mirror inertia for calculating the mirror angular rate estimated state.

6. The assembly according to claim 2 wherein the plurality of estimated states further includes the integral of the rigid block angle.

7. The assembly according to claim 2 wherein the plurality of estimated states further includes the rigid block angular rate.

8. In an optical system including a mirror, a method for rejecting environmental perturbations to the system and tracking a command line of sight, the method comprising the steps of:
   flexibly coupling the mirror to a rigid block to provide two axes of rotational freedom for the mirror;
   providing torquer means for torquing the mirror about each of said axes;
   providing pickoff means which generates pickoff signals corresponding to the angular position of the mirror relative to the rigid block about each of said axes; and
   controlling the torquer means by receiving the pickoff signals and utilizing the dynamic properties of the mirror as coupled to the rigid block and the dynamic properties of the rigid block to provide a torquer signal for each of said axes to said torquer means, wherein the mirror is utilized in conjunction with the torquer means and the pickoff means as an inertial sensor to provide a measure of the angular motion of the rigid block, and as a control effector means to isolate the line of sight from unintentional, higher frequency rigid block motion and to cause the optical system line of sight to track intentional, lower frequency rigid block motion.

9. The method according to claim 8 wherein the step of controlling includes, for each of said axes, the step of utilizing the respective pickoff signal to calculate a plurality of estimated states used for generating the respective torquer signal, the plurality of calculated estimated states including at least mirror angle, mirror angular rate and rigid block angle.

10. The method according to claim 9 wherein the step of controlling further includes the steps of:
    multiplying each calculated estimated state by a respective gain coefficient; and
    summing the results to generate the respective torquer signal.

11. The method according to claim 10 wherein the step of controlling further includes the steps of:
    subtracting the rigid block angle estimated state from the mirror angle estimated state to derive an estimated pickoff angle signal;
    subtracting the estimated pickoff angle signal from the respective received pickoff signal; and
    calculating the plurality of estimated states by utilizing the results of the second subtraction.

12. The method according to claim 11 wherein the step of controlling utilizes a model of the mirror and flexible coupling means for calculating the mirror angular rate estimated state, in which model the estimated pickoff angle signal is multiplied by the ratio of the angular spring rate of the flexible coupling means to the mirror inertia and the result is subtracted from the result of dividing the torquer signal by the mirror inertia.

13. The method according to claim 9 wherein the calculated plurality of estimated states further includes the integral of the rigid block angle.

14. The method according to claim 9 wherein the calculated plurality of estimated states further includes the rigid block angular rate.

* * * * *